(12) United States Patent
Sozio

(10) Patent No.: US 12,295,357 B2
(45) Date of Patent: May 13, 2025

(54) LOBSTER CATCHING DEVICE

(71) Applicant: Michael Sozio, Orlando, FL (US)

(72) Inventor: Michael Sozio, Orlando, FL (US)

( * ) Notice: Subject to any disclaimer, the term of this patent is extended or adjusted under 35 U.S.C. 154(b) by 0 days.

(21) Appl. No.: 18/207,454

(22) Filed: Jun. 8, 2023

(65) Prior Publication Data

US 2023/0397585 A1 Dec. 14, 2023

Related U.S. Application Data

(60) Provisional application No. 63/366,390, filed on Jun. 14, 2022.

(51) Int. Cl.
*A01K 74/00* (2006.01)
*B25J 1/02* (2006.01)

(52) U.S. Cl.
CPC ............. *A01K 74/00* (2013.01); *B25J 1/02* (2013.01)

(58) Field of Classification Search
USPC ......... 119/807, 806, 808, 799, 801; 294/1.3, 294/1.4, 87.22, 87.24, 87.26, 196, 207, 294/8.5, 10, 11, 86.4; 81/300, 342, 383
See application file for complete search history.

(56) References Cited

U.S. PATENT DOCUMENTS

| | | | | |
|---|---|---|---|---|
| 1,842,403 A * | 1/1932 | Hunsaker | ............ | A45D 26/0066 359/810 |
| 2,387,054 A * | 10/1945 | Brustolon | .......... | A45D 26/0066 359/810 |
| 3,208,786 A * | 9/1965 | Eddleman | ............. | B65D 25/08 294/115 |
| 3,872,834 A * | 3/1975 | Fuhrman | ............. | A01K 15/003 D30/162 |
| 4,136,900 A * | 1/1979 | Thompson | ........... | A01K 23/005 294/1.5 |
| 4,483,562 A | 11/1984 | Schoolman | | |
| 5,048,221 A * | 9/1991 | Kunkel | ................. | A01K 97/14 43/6 |
| 5,119,585 A * | 6/1992 | Camp | .................... | G01G 19/60 177/148 |
| D333,075 S * | 2/1993 | Incantalupo | ..................... | D8/51 |
| 5,370,648 A * | 12/1994 | Cracraft | ................ | A61B 17/28 606/1 |

(Continued)

FOREIGN PATENT DOCUMENTS

CA 2260545 A1 * 7/1999 ......... A45D 26/0066

*Primary Examiner* — Andrea M Valenti
(74) *Attorney, Agent, or Firm* — Jason T. Daniel, Esq.; Daniel Law Offices, P.A.

(57) ABSTRACT

A lobster catching device includes an elongated hollow shaft having a control mechanism connected to the first end, and a grasping assembly connected to the second end. The control mechanism includes a handle and trigger that move a wire within the shaft. The wire transitions a pair of arms extending outward from the grasping assembly between an open and closed position, and a trigger lock secures the assembly in the current position when engaged. The arms are constructed from a malleable material which bends when a maximum pressure is applied onto the lobster to prevent crushing the animal. A blocking panel is connected to the main body of the grasping assembly and includes a planar member that is oriented parallel to the arms. The blocking panel engages the tail of a lobster when the arms are grabbing the carapace.

17 Claims, 4 Drawing Sheets

(56) References Cited

U.S. PATENT DOCUMENTS

| | | | | |
|---|---|---|---|---|
| 7,344,171 B1 * | 3/2008 | McMullan | ............ | E01H 1/1206 |
| | | | | 294/902 |
| 7,644,532 B2 * | 1/2010 | Capio | .................... | A01K 77/00 |
| | | | | 43/7 |
| 7,730,657 B1 * | 6/2010 | Gierucki | ................ | A01K 77/00 |
| | | | | 294/111 |
| 7,810,859 B1 * | 10/2010 | Montusi | ................ | E01H 1/1206 |
| | | | | 294/1.3 |
| 8,176,878 B1 * | 5/2012 | Wexler | .................. | A01K 25/00 |
| | | | | 119/799 |
| 11,208,776 B1 * | 12/2021 | Judd | .................... | A01K 23/005 |
| 11,745,330 B2 * | 9/2023 | Brackett | .................... | B25J 1/02 |
| | | | | 294/106 |
| 2015/0230811 A1 * | 8/2015 | Kovarik | ................ | A01K 77/00 |
| | | | | 606/174 |
| 2019/0246614 A1 * | 8/2019 | Healy, Jr. | ............... | A01K 97/00 |

* cited by examiner

LOBSTER CATCHING DEVICE

CROSS-REFERENCE TO RELATED APPLICATIONS

This application claims the benefit of U.S. Application Ser. No. 63/366,390 filed on Jun. 14, 2022, the contents of which are incorporated herein by reference.

TECHNICAL FIELD

The present invention relates generally to the lobster harvesting industry, and more particularly to a recreational lobster catching device.

BACKGROUND

The statements in this section merely provide background information related to the present disclosure and may not constitute prior art.

Recreational lobster "fishing" is a fun and exciting pastime for many individuals. Unlike traditional fishing, lobster fishing requires users to physically enter the water and swim to find lobsters on the sandy bottom of the ocean. As such, users typically utilize scuba diving equipment or snorkeling gear to be able to explore the coral, rocks, and burrows where lobsters like to hide. As such, it is beneficial for the diver to carry as little gear as possible in order to allow them to use their hands to swim and explore the rocks and other areas.

Currently, the most common means for catching lobsters recreationally is for the diver to use an elongated wire to "tickle" the lobster out of their hole or other hiding spot. Once the lobster is mostly out of the hole, the diver uses their second hand to place a net behind the lobster before it can use its powerful tail to swim away. Once the lobster is in the net, the diver must quickly grab the lobster to prevent it from swimming out of the net.

As such, this process requires the diver to carry multiple pieces of equipment, and to use both hands continuously to operate the equipment when attempting to catch the lobster. Unfortunately, the use of the net and/or the grabbing action by the diver is often responsible for causing injury to the lobster in the form of broken antennae which limits the ability of the lobster to survive if they escape or are later released.

Another more recent means for catching lobsters is to utilize a snare device having an elongated wire having a loop (snare) along one end. The device operates whereby the diver positions the loop about the carapace of the lobster, and then uses their other hand to pull on the cord to tighten the loop around the lobster to prevent it from moving or escaping. Unfortunately, it is exceedingly difficult to position the snare about the lobster, thus allowing many lobsters to escape before being caught, and the force these snares apply onto the lobster's carapace are notorious for harming or killing lobsters, especially immature lobsters which are required to be released.

Accordingly, it would be beneficial to provide a lobster catching device that allows a user to gently catch a lobster using one hand without the drawbacks noted above.

SUMMARY OF THE INVENTION

The present invention is directed to a lobster catching device. One embodiment of the present invention can include an elongated hollow shaft having a control mechanism connected to the first end, and a grasping assembly connected to the second end.

The control mechanism can include a handle and trigger that is connected to a wire within the shaft. The trigger can selectively move the wire to transition the grasping assembly between an open and closed position. A trigger lock can be positioned within the handle and can lock the assembly in the current position when engaged.

The grasping assembly can include a body member having a pair of elongated arms extending outward therefrom. The arms can move toward and away from each other so as to selectively grasp each side of a lobster carapace. The arms can be constructed from a malleable material which bends when maximum pressure is applied onto the lobster to prevent crushing the animal.

A blocking panel can be connected to the main body of the grasping assembly and can include a planar member that is oriented parallel to the arms. The blocking panel can also include a net and can engage the tail of a lobster while using the device. An optional light and lanyard are also provided.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
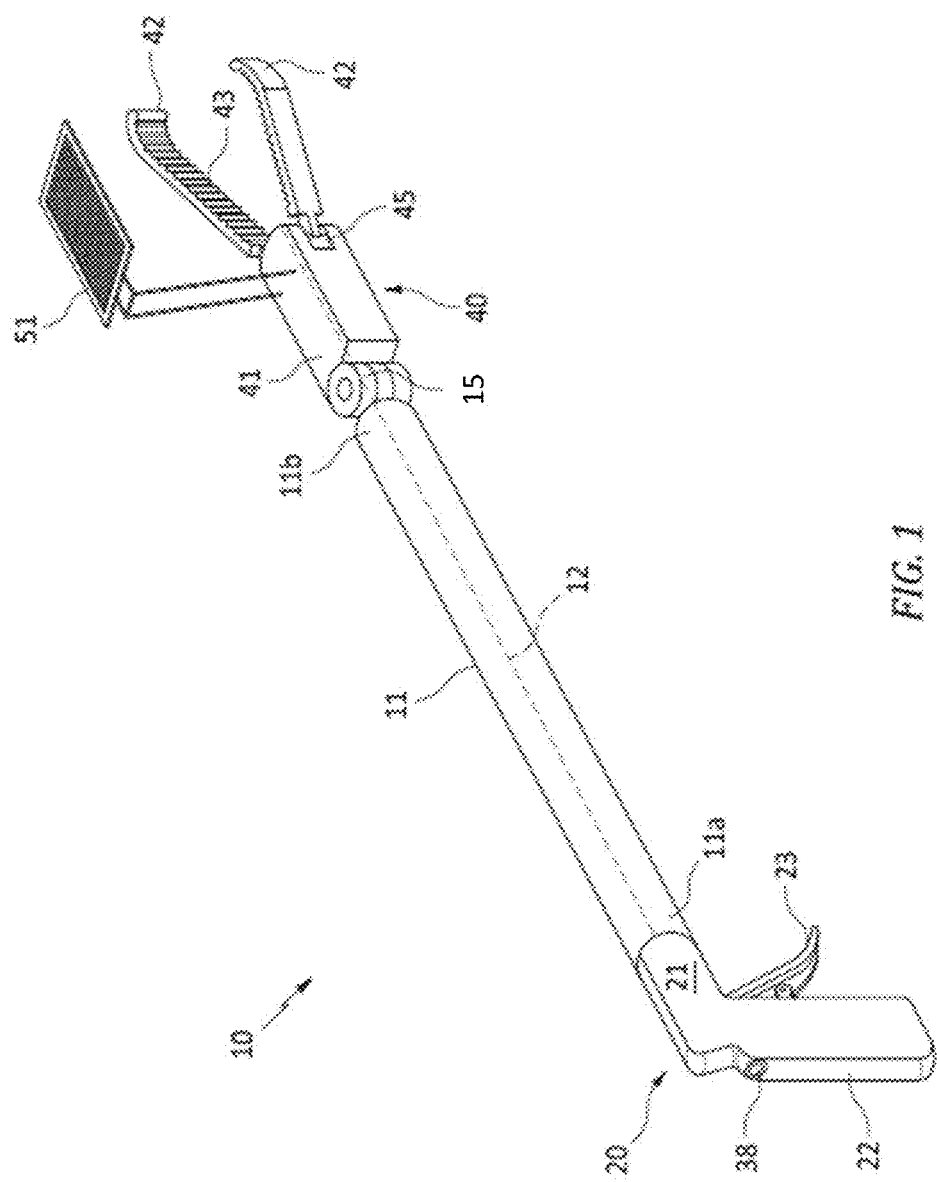
FIG. 1 is a perspective view of a lobster catching device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated. Objects can be removably secured via one or more of the below described connectors.

As described herein, the term "connector" includes any number of different elements that work alone or together to repeatedly join two items together in a nonpermanent manner. Several nonlimiting examples of connectors include, but are not limited to, flexible strips of interlocking projections with a slider (i.e., zipper), thread-to-connect, twist-to-connect, and push-to-connect type devices, opposing strips of hook and loop material (e.g., Velcro®), attractively oriented magnetic elements or magnetic and metallic elements, buckles such as side release buckles, clamps, sockets, clips, carabiners, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

FIGS. 1-4 illustrate one embodiment of a lobster catching device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown best at FIG. 1, the system 10 can include, essentially, an elongated shaft 11 that is connected to a control mechanism 20 on a first end, and a grasping assembly 40 having a lobster blocking panel 51 along the second end.

The elongated shaft 11 can include any number of different lengths shapes and sizes and can be constructed from any number of materials that are suitable for prolonged exposure to saltwater without corroding and that are relatively strong and stiff for their weight. Several nonlimiting examples include but are not limited to various metals or metal alloys (e.g., aluminum, steel, titanium, or alloys thereof), plastic/polymers (e.g., high-density polyethylene (HDPE), rigid polyvinyl chloride (PVC), malleable polyethylene terephthalate (PET)), and/or various composite materials (e.g., carbon fibers in a polymer matrix, fiberglass, etc.).

In one embodiment, a hinge 15 can be positioned between the distal end of the shaft 11b and the grasping assembly body 41. The hinge can function in the expected manner to permit the grasping assembly 40 to rotate and/or pivot up to 90 degrees relative to the orientation of the shaft 11 as shown by arrow B of FIG. 4. Of course, other embodiments are contemplated wherein the shaft is connected directly to the grasping assembly so as to maintain a fixed orientation of the components relative to each other.

Additionally, other embodiments are contemplated wherein the hinge 15 or a second hinge is provided at a different location along the shaft such as adjacent to the control mechanism to provide an independent means for rotating or pivoting the handle relative to the grasping assembly.

In one embodiment, an elongated wire 12 can extend throughout the length of the shaft 11 and can include a proximal end that is connected to the control mechanism 20, and a distal end that is connected to the grasping assembly 40. The wire can preferably be metallic in nature and can extend through a central opening in the hinge 15 in order to mate with the grasping assembly.

Figure 2:
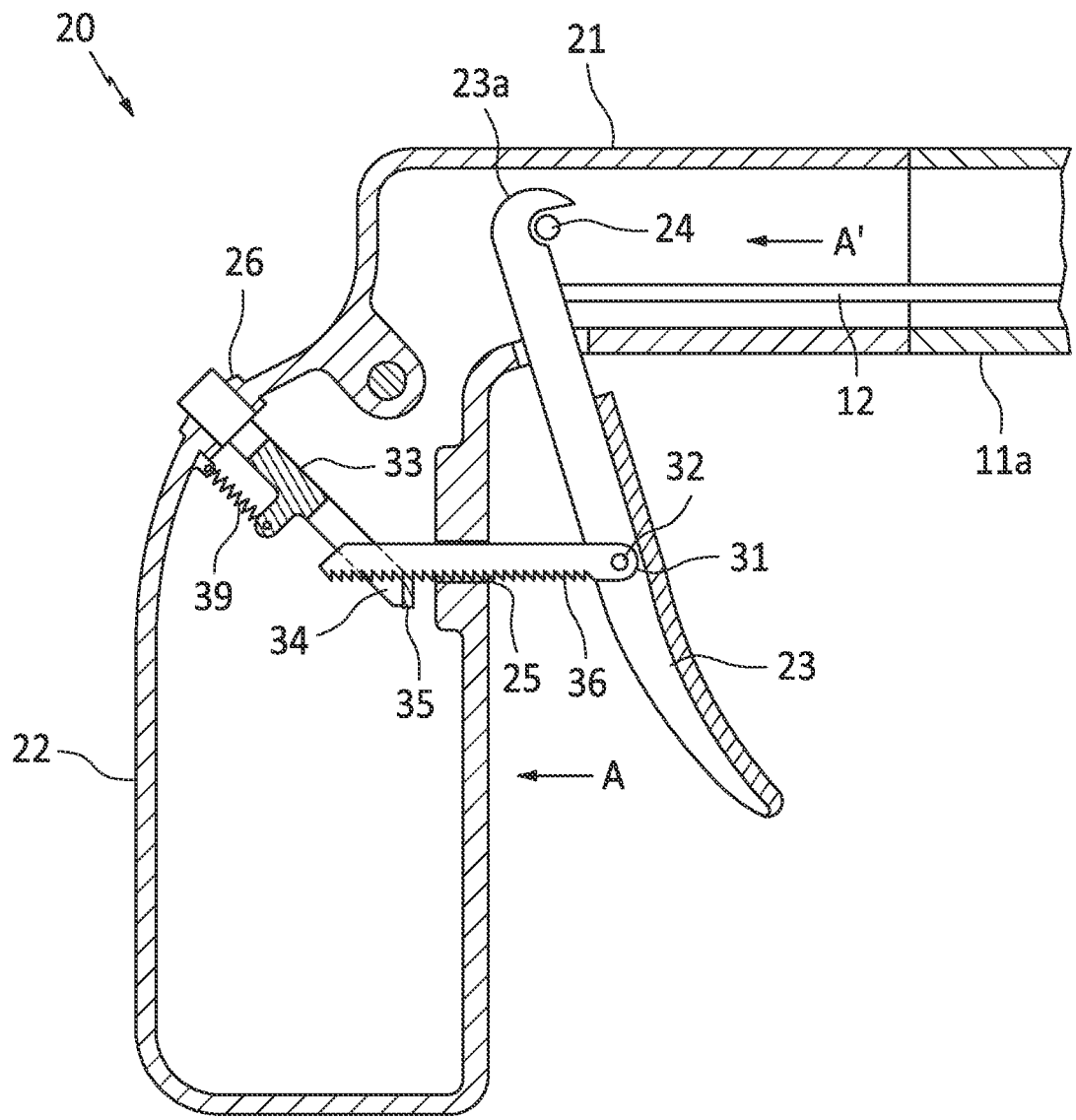
FIG. 2 is an enlarged cross-sectional view of the control mechanism of the lobster catching device in accordance with one embodiment of the invention.

As shown best at FIG. 2, the control mechanism 20 can be positioned along the proximal end of the shaft 11a and can function to selectively operate the grasping assembly 40 via the wire 12. In one embodiment, the control mechanism can include the illustrated trigger grip shape having a body section 21, a fixed handle 22 and a trigger handle 23. In one embodiment, the upper portion of the trigger handle 23a pivots around a hub 24 and is connected to the wire 12 such that squeezing the trigger (see arrow A) causes the wire 12 to move along the axial direction of the shaft 11 in the same direction (arrow A').

In one embodiment, a trigger lock can be provided to retain the trigger 23 in a compressed state, which has the effect of locking the fingers 42 of the grasping assembly 40 in their current position. As shown, the trigger lock can include a finger 31 that is pivotally attached to the trigger 23 via pin 32 and which extends into the handle 22 via a first slot 25. A stop mechanism 33 can be positioned within the handle 22 and can include a first end 34 having a tab 35 extending outward therefrom.

As shown, the finger 31 can include a plurality of serrations 36 which engage the tab 35 to prevent movement of the trigger 23 in a direction away from handle 22 when engaged. In this regard, the position of trigger 23 relative to handle 22 can be maintained by the combined cooperation of the below described spring 44 which functions to bias the trigger 23 away from the handle 22 and which forces the serrations 36 into forceful contact with the tab 35 on the stop mechanism 33.

The stop mechanism 33 can be released by depressing button 38 which can bias the tab 35 away from contact with the serrations 36 of the finger 31. When the stop mechanism 33 is biased in this manner, the trigger 23 is allowed to move freely. In one embodiment, a tension spring 39 can be connected from the stop mechanism to a portion of the handle 22 and can function to continually exert a force on the stop mechanism in a direction away from the second slot 26 which acts to keep the tab 35 in forceful contact with the finger serrations 36.

Although described above as including a single movable trigger 23 having a trigger stop mechanism and a plurality of internal components for moving the wire 12 to control the grasping assembly 40, this is for illustrative purposes only. To this end, any number of control mechanisms and components are contemplated for allowing a user to selectively open, close and/or lock the grasping assembly using a single hand.

Moreover, although the finger 36 is illustrated as being exposed, this is but one arrangement of the components, as other embodiments are contemplated wherein the trigger includes a hollow portion that extends telescopically within an opening along the handle and such components are located inside the trigger itself.

Figure 3:
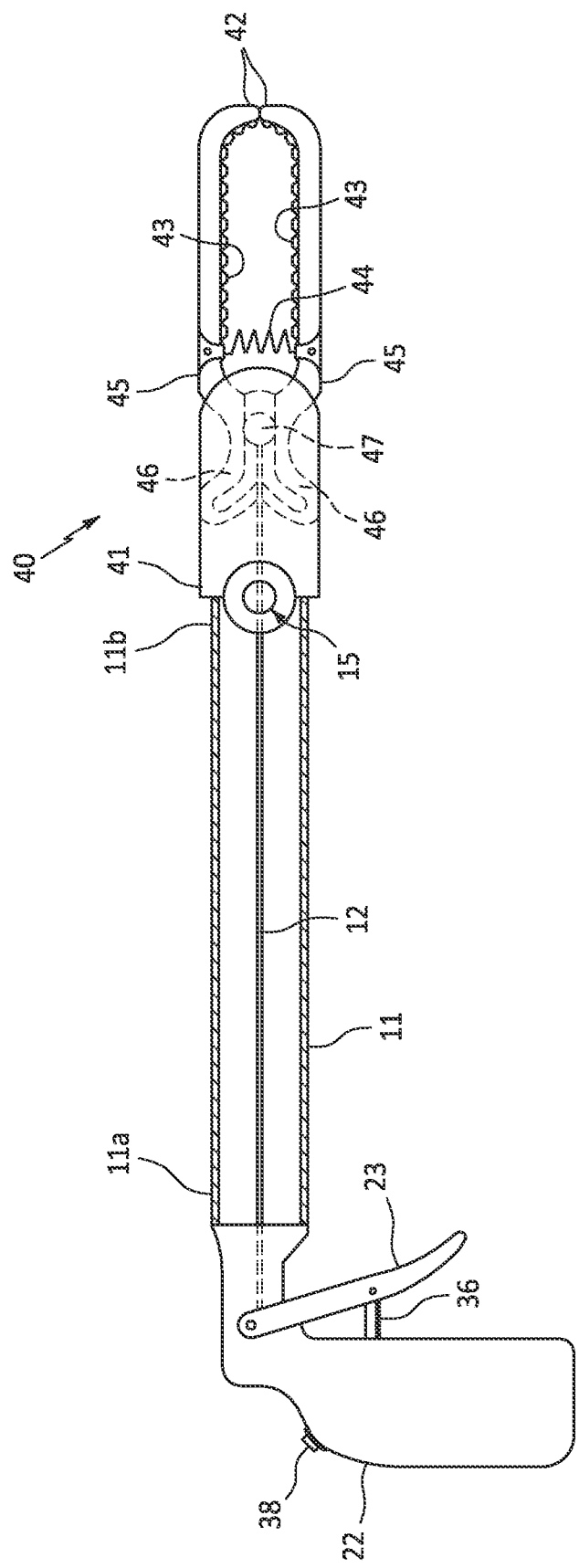
FIG. 3 is a side view of the lobster catching device with the arms of the grasping assembly closed, showing its inner workings, in accordance with one embodiment of the invention.

FIG. 3, illustrates one embodiment of the grasping assembly 40 where the lobster blocking panel is removed for ease of illustration. As shown, the assembly can be positioned along the distal end of the shaft 11b via the hinge 15 and can include a housing 41 that is connected to the distal end of the shaft 11b. In one embodiment, a pair of arms 42 which pinch together to grasp a lobster when the trigger 23 is squeezed. As described herein, each of the arms 42 can include any number of different shapes and sizes. In one embodiment, the inside facing surface of the arms 43 can include a layer of rubber or other soft and high friction material that can engage the sharp spines of a lobster without losing traction and while providing impact cushioning to the lobster itself.

In the preferred embodiment, each of the arms 42 can be constructed from a semi-malleable material such as plastic, for example, that is capable of bending and flexing when encountering a specific force or resistance. In one embodiment, the arms can be designed to bend or flex upon applying a maximum force of about two pounds onto a lobster. Such a force being specifically chosen to provide the device with sufficient strength to grasp and immobilize a lobster but without enough force to crush or otherwise damage the lobster's carapace. Of course, other construction materials and amounts of force are also contemplated.

In one embodiment, the arms 42 can be connected via a compression spring 44 to bias the arms in the open position. Such a feature imparts a pulling force onto the trigger 23 which must be overcome by the user when grasping the handle and squeezing the trigger on the control mechanism 20. Each of the arms 42 can be retained and pivot around jaw pivot pins 45. Curved jaw shafts 46 can extend from the proximal ends of the arms 42 and act as an extension which aids in the movement of the jaws around a central jaw pin 47 which is selectively pushed and pulled by the wire 12, thus transitioning the arms between the open position (FIG. 1) and the closed position (FIG. 3), respectively.

Although described above with regard to specific components for imparting movement on the pair of arms 42, this is for illustrative purposes only, as any number of other components and arrangements of components are contemplated for permitting the arms to move in the manner described upon actuation of the control mechanism. Moreover, although illustrated with regard to two arms, the device may include any number of arms which may be positioned at any number of different orientations relative to each other so as to engage and capture a lobster.

Figure 4:
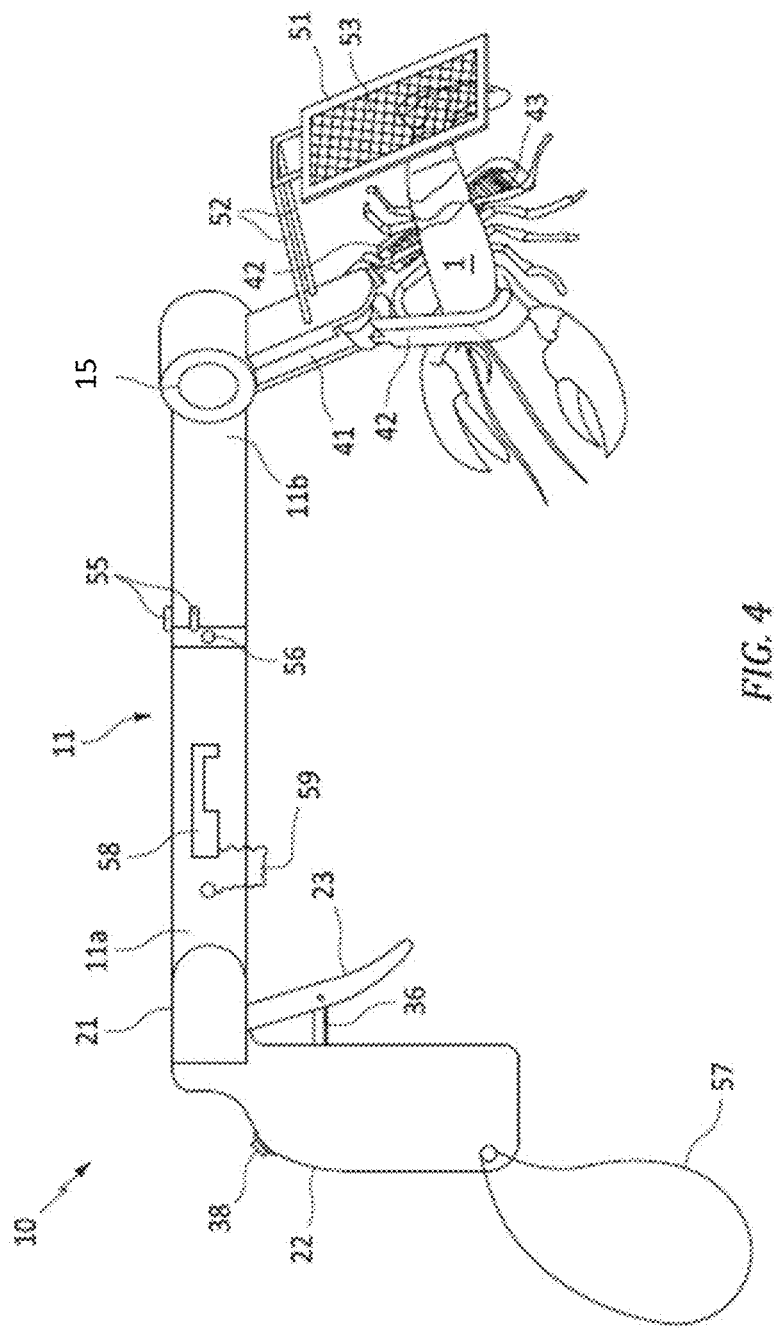
FIG. 4 a perspective view of the lobster catching device in operation, in accordance with one embodiment of the invention.

As shown best at FIG. 4, the device 10 can include a blocking panel 51 that is positioned generally parallel to the fingers 42 of the grasping assembly via a mounting arm 52 extending perpendicular to the assembly body 41. The mounting arm can function to permanently or removably secure the blocking panel onto the device. In one embodiment, the mounting arm can be telescopic in nature (e.g., the length of the arm can expand and contract) so as to allow a user to adjust the distance between the blocking panel 51 and the arms 42.

In various embodiments, the blocking panel can comprise a solid piece of rigid material such as a plastic, for example, and/or can include or comprise a semi-flexible material such as a nylon net 53, for example. In operation, the plate is designed and oriented so as to be positioned behind the lobster when the fingers 42 are alongside the lobster's body. If/when the lobster attempts to swim away, the plate blocks the backward movement of the lobster and allows the fingers to engage the lobster's carapace.

The inclusion of the blocking panel is important, as it ensures contact with the lobster at three distinct locations—each side of the lobster's carapace 1 and the tail 2. By providing a device that engages the lobster at three locations, and that prevents harmful force being applied to the lobster's body, the device advantageously increases the likelihood of successfully capturing the lobster while drastically reducing the chance of harming the animal during the process.

FIG. 4 also shows an optional light which can be positioned along the shaft 11. The light can preferably comprise a plurality of battery-operated LED's 55 having a switch 56 for allowing the diver to turn the light ON and OFF. Such a feature is beneficial as it eliminates the need for the diver to carry a separate light for shining into rocks and other crevices where lobsters hide. Additionally, an optional lanyard 57 can be provided for preventing the device from being accidentally dropped and lost while diving. Such a feature further freeing up the hands of the diver while in the water.

Finally, a lobster measuring tool 58 can be removably connected onto one of the shafts, the handle, the grasping assembly or the panel via a connector (not shown). In one embodiment, a lanyard 59 can be provided, and can be positioned so as to allow a user to measure the lobster while it is being held by the grasping assembly. As is known in the art, regulations mandate that lobsters be measured before they are harvested to ensure juveniles are not taken. The inclusion of the tool on the device further eliminates the need for the diver to carry additional equipment, and aids in ensuring the catch is legal.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A lobster catching device, comprising:
   an elongated shaft having a first end and a second end;
   a control mechanism that is connected to the first end of the elongated shaft;
   a hinge that is positioned along the second end of the elongated shaft,
   a grasping assembly that is connected to the hinge, said grasping assembly including a main body and a pair of arms extending outward therefrom; and
   a blocking panel that is a planar member connected to the main body of the grasping assembly, a mounting arm connected between the blocking panel and the main body of the grasping assembly, positioning the blocking panel parallel to the pair of arms,
   wherein the control mechanism includes functionality for transitioning the grasping assembly between a closed position and an open position, and
   wherein the hinge includes functionality to selectively rotate or pivot the grasping assembly and the blocking panel as a unit relative to the elongated shaft, and
   in the closed position, the pair of arms are configured to engage along both sides of the lobster and simultaneously the blocking panel engages a tail of the lobster, wherein the lobster is in contact with the catching device in three distinct locations preventing the lobster from swimming away.

2. The device of claim 1, further comprising:
   the mounting arm extends orthogonally outward from the main body of the grasping assembly.

3. The device of claim 2, wherein the blocking panel is constructed from a rigid piece of solid material.

4. The device of claim 3, wherein the blocking panel is constructed from a rigid piece of plastic.

5. The device of claim 3, wherein the blocking panel includes a net.

6. The device of claim 1, wherein an inside surface of each of the pair of arms are touching when the grasping assembly is in the closed position when a lobster is not present.

7. The device of claim 1, wherein the inside surface of each of the pair of arms are not touching when the grasping assembly is in the open position.

8. The device of claim 1, wherein the control mechanism includes a fixed handle and a trigger.

9. The device of claim 8, wherein the elongated shaft is hollow.

10. The device of claim 9, further comprising:
    an elongated wire that is positioned within the elongated shaft, said wire having a first end that is connected to the trigger, and a second end that is connected to the grasping assembly.

11. The device of claim 10, wherein the grasping assembly transitions between the closed position and the open position based on a movement of the trigger.

12. The device of claim 1, further comprising:
    a light that is positioned along the elongated shaft.

13. The device of claim 1, further comprising:
    a lanyard that is connected to the control mechanism.

14. The device of claim 13, further comprising:
    a lobster measuring tool that is removably connected to one of the lanyard or the elongated shaft.

15. The device of claim 1, wherein the blocking panel is removably connected onto the mounting arm.

16. The device of claim 1, wherein a length of the mounting arm is adjustable.

17. The device of claim 1, wherein the pair of arms of the grasping assembly are configured to impart a maximum force of two pounds onto the lobster.

\* \* \* \* \*